United States Patent
Kato et al.

(10) Patent No.: US 10,605,956 B2
(45) Date of Patent: *Mar. 31, 2020

(54) POLYCARBONATE RESIN AND OPTICAL LENS

(71) Applicant: MITSUBISHI GAS CHEMICAL COMPANY, INC., Tokyo (JP)

(72) Inventors: Noriyuki Kato, Tokyo (JP); Manabu Hirakawa, Tokyo (JP); Takashi Motoi, Okayama (JP); Mitsuharu Kitamura, Niigata (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 23 days.

This patent is subject to a terminal disclaimer.

(21) Appl. No.: 16/030,223

(22) Filed: Jul. 9, 2018

(65) Prior Publication Data

US 2019/0033489 A1 Jan. 31, 2019

Related U.S. Application Data

(63) Continuation of application No. 15/508,741, filed as application No. PCT/JP2015/077245 on Sep. 28, 2015, now Pat. No. 10,048,404.

(30) Foreign Application Priority Data

Sep. 30, 2014 (JP) ................. 2014-200807
Mar. 27, 2015 (JP) ................. 2015-065896

(51) Int. Cl.
*C08G 64/02* (2006.01)
*G02B 1/04* (2006.01)
*C08G 64/30* (2006.01)
*C08L 33/06* (2006.01)
*C08L 69/00* (2006.01)
*G02B 5/30* (2006.01)

(52) U.S. Cl.
CPC ............ *G02B 1/041* (2013.01); *C08G 64/02* (2013.01); *C08G 64/305* (2013.01); *C08L 33/06* (2013.01); *C08L 69/005* (2013.01); *G02B 1/04* (2013.01); *G02B 5/3083* (2013.01); *C08J 2369/00* (2013.01)

(58) Field of Classification Search
USPC .................. 528/107, 196, 198, 271, 272
See application file for complete search history.

(56) References Cited

U.S. PATENT DOCUMENTS

2011/0272183 A1 11/2011 Ooga et al.
2015/0285954 A1 10/2015 Ishizuka et al.

FOREIGN PATENT DOCUMENTS

| JP | 02-69520 | 3/1990 |
|----|----------|--------|
| JP | 04-338594 | 11/1992 |
| JP | 05-70584 | 3/1993 |
| JP | 05-155964 | 6/1993 |
| JP | 05-341124 | 12/1993 |
| JP | 2007-161917 | 6/2007 |
| JP | 2014-091787 | 5/2014 |
| WO | 2010/084872 | 7/2010 |
| WO | 2014/073496 | 5/2014 |
| WO | 2015/147242 | 10/2015 |

OTHER PUBLICATIONS

International Search Report issued in Patent Application No. PCT/JP2015/077245, dated Dec. 22, 2015.

*Primary Examiner* — Terressa Boykin
(74) *Attorney, Agent, or Firm* — Greenblum & Bernstein, P.L.C.

(57) ABSTRACT

The present invention addresses the problem of providing a resin having a high Abbe number and a small difference in hygroscopic expansion coefficient with respect to a polycarbonate resin having a low Abbe number and a high refractive index. The above problem can be solved by a polycarbonate resin including structural units represented by general formula (1). In general formula (1), R represents H, $CH_3$, or $C_2H_5$.

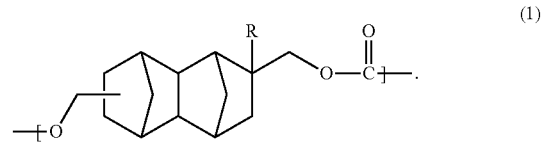

(1)

6 Claims, 4 Drawing Sheets

[Figure 3]

POLYCARBONATE RESIN AND OPTICAL LENS

The present application is a Continuation of U.S. application Ser. No. 15/508,741, filed Mar. 3, 2017, which is a National Stage of International Patent Application No. PCT/JP2015/077245 filed Sep. 28, 2015, which claims priority to Japanese Application No. 2015-065896, filed Mar. 27, 2015 and Japanese Application No. 2014-200807, filed Sep. 30, 2014. The disclosures of U.S. application Ser. No. 15/508,741 and International Patent Application No. PCT/JP2015/077245 are expressly incorporated by reference herein in their entireties.

TECHNICAL FIELD

The present invention relates to a novel polycarbonate resin and an optical lens formed by using the same. The present invention also relates to an optical lens which has a high Abbe number, low birefringence, high transparency and a high glass transition temperature (heat resistance) in good balance.

BACKGROUND ART

As a material of optical elements to be used in optical systems of various cameras such as cameras, film integrated type cameras and video cameras, an optical glass or an optical transparent resin is used. Optical glasses are excellent in heat resistance, transparency, size stability, chemical resistance, etc., and there are various materials with different refractive indexes (nD) or Abbe numbers (vD). However, optical glasses have problems of high material costs, bad molding processability and low productivity. In particular, significantly advanced techniques and high costs are required for processing for obtaining an aspherical lens to be used for aberration correction, and this is a major obstacle from a practical viewpoint.

Meanwhile, advantageously, optical lenses made of optical transparent resins, particularly thermoplastic transparent resins can be mass-produced by injection molding, and in addition, an aspherical lens can be easily produced therefrom. Such optical lenses are currently used as camera lenses. Examples thereof include a polycarbonate consisting of bisphenol A, polystyrene, poly-4-methylpentene, a polymethyl methacrylate and an amorphous polyolefin.

However, when using an optical transparent resin as an optical lens, in addition to the refractive index and Abbe number, transparency, heat resistance and low birefringence are also required, and therefore it has a weak point that portions for use thereof are limited depending on the balance of characteristics of the resin. For example, polystyrene has low heat resistance and high birefringence, poly-4-methylpentene has low heat resistance, polymethyl methacrylate has a low glass transition temperature, low heat resistance and a low refractive index, and therefore use areas of these materials are limited, and a polycarbonate consisting of bisphenol A has weak points such as high birefringence, and therefore portions for use thereof are limited. Accordingly, these materials are undesirable.

Meanwhile, in general, when the refractive index of an optical material is high, a lens element having the same refractive index can be realized with a surface having a smaller curvature. Therefore, the amount of aberration generated on this surface can be reduced, and reduction in size and weight of a lens system can be realized by reduction in the number of lenses, reduction in the eccentricity sensitivity of the lens and reduction in the thickness of the lens. For this reason, it is useful to provide a high refractive index.

Further, regarding the optical design of optical units, it is known that chromatic aberration is corrected by combined use of a plurality of lenses with different Abbe numbers. For example, chromatic aberration is corrected by combined use of a lens made of an alicyclic polyolefin resin having an Abbe number of 45 to 60 and a lens made of a polycarbonate resin consisting of bisphenol A having a low Abbe number (nD=1.59, vD=29).

Among optical transparent resins which have been put to practical use in applications for optical lenses, examples of those having a high Abbe number include polymethyl methacrylate (PMMA) and cycloolefin polymer. In particular, cycloolefin polymer has excellent heat resistance and mechanical characteristics and therefore has been widely used in applications for optical lenses.

Examples of resins having a low Abbe number include polyester and polycarbonate. For example, the resin described in Patent Document 1 is characterized in that it has a high refractive index and a low Abbe number.

There is a difference between the hygroscopic expansion coefficient of cycloolefin polymer having a high Abbe number and the hygroscopic expansion coefficient of a polycarbonate resin that is a polymer having a low Abbe number. When forming a lens unit by combining these two types of lenses, the difference between the sizes of the lenses is made at the time of water absorption depending on an operating environment of a smartphone or the like. Due to the difference of the expansion rate, performance of the lens is impaired.

Patent Documents 2 to 4 describe polycarbonate copolymers containing a perhydroxy dimethanonaphthalene skeleton, but since the dihydroxymethyl group is positioned at 2,3-position in each case, the strength is low, and therefore these materials are not suitable for use in optical lenses. In addition, the polycarbonates described in Patent Documents 2 to 4 have a low glass transition temperature (Tg), and accordingly have a problem in terms of heat resistance. For example, the homogeneous polycarbonate described in Example 1 of Patent Document 4 has a number-average molecular weight of 38000, but the glass transition temperature (Tg) thereof is low (125° C.).

PRIOR ART DOCUMENTS

Patent Documents

Patent Document 1: International Publication WO2014/73496 pamphlet
Patent Document 2: Japanese Laid-Open Patent Publication No. H05-70584
Patent Document 3: Japanese Laid-Open Patent Publication No. H02-69520
Patent Document 4: Japanese Laid-Open Patent Publication No. H05-341124

SUMMARY OF THE INVENTION

Problems to be Solved by the Invention

The problems to be solved by the present invention are to provide a resin having a high Abbe number, wherein the difference between the hygroscopic expansion coefficient thereof and that of a polycarbonate resin having a high refractive index and a low Abbe number is small, and to provide an optical lens produced from this resin.

Means for Solving the Problems

The present inventors diligently made researches in order to solve the above-described problems, and found that a polycarbonate resin obtained by using decahydro-1,4:5,8-dimethanonaphthalene diol (D-NDM) as a raw material can solve the above-described problems, and thus the present invention was achieved.

Specifically, the present invention relates to a polycarbonate resin and an optical lens described below:

<1> A polycarbonate resin comprising a structural unit represented by general formula (1) below:

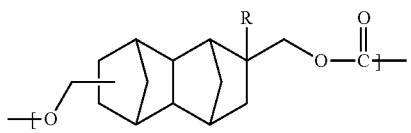

wherein R represents H, $CH_3$ or $C_2H_5$.

<2> The polycarbonate resin according to item <1>, which comprises a mixture of: an isomer to which a —$CH_2O$— group in general formula (1) is bound at 6-position (isomer of 2,6-position); and an isomer to which the —$CH_2O$— group in general formula (1) is bound at 7-position (isomer of 2,7-position).

<3> The polycarbonate resin according to item <2>, wherein the isomer of 2,6-position and the isomer of 2,7-position are contained at a mass ratio of 1.0:99.0 to 99.0:1.0.

<4> The polycarbonate resin according to any one of items <1> to <3>, which has a hygroscopic expansion coefficient of 0.01 to 0.5%.

<5> The polycarbonate resin according to any one of items <1> to <4>, which has an Abbe number of 25 or higher.

<6> The polycarbonate resin according to any one of items <1> to <5>, which has a glass transition temperature of 110 to 160° C.

<7> The polycarbonate resin according to any one of items <1> to <6>, which has a weight-average molecular weight of 5,000 to 50,000.

<8> An optical lens obtained by molding the polycarbonate resin according to any one of items <1> to <7>.

<9> A method for producing a polycarbonate resin, which comprises reacting a diester carbonate with a diol compound represented by general formula (2) below:

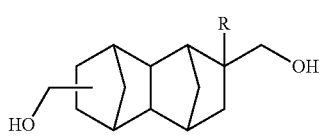

wherein R represents H, $CH_3$ or $C_2H_5$.

<10> The method for producing a polycarbonate resin according to item <9>, wherein the diol compound comprises a mixture of: an isomer to which a —$CH_2OH$ group in general formula (2) is bound at 6-position (isomer of 2,6-position); and an isomer to which the —$CH_2OH$ group in general formula (2) is bound at 7-position (isomer of 2,7-position):

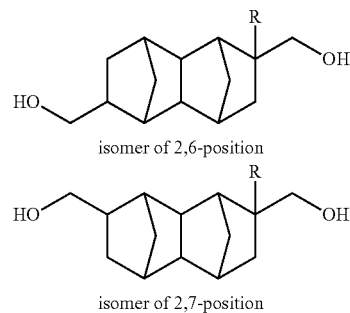

isomer of 2,6-position isomer of 2,7-position

<11> The method for producing a polycarbonate resin according to item <10>, wherein the isomer of 2,6-position and the isomer of 2,7-position are contained at a mass ratio of 1.0:99.0 to 99.0:1.0.

Advantageous Effect of the Invention

According to the present invention, it is possible to obtain a resin having a high Abbe number, wherein the difference between the hygroscopic expansion coefficient thereof and that of a polycarbonate resin having a high refractive index and a low Abbe number is small. In addition, it is possible to obtain an optical lens produced from this resin.

Figure 1:
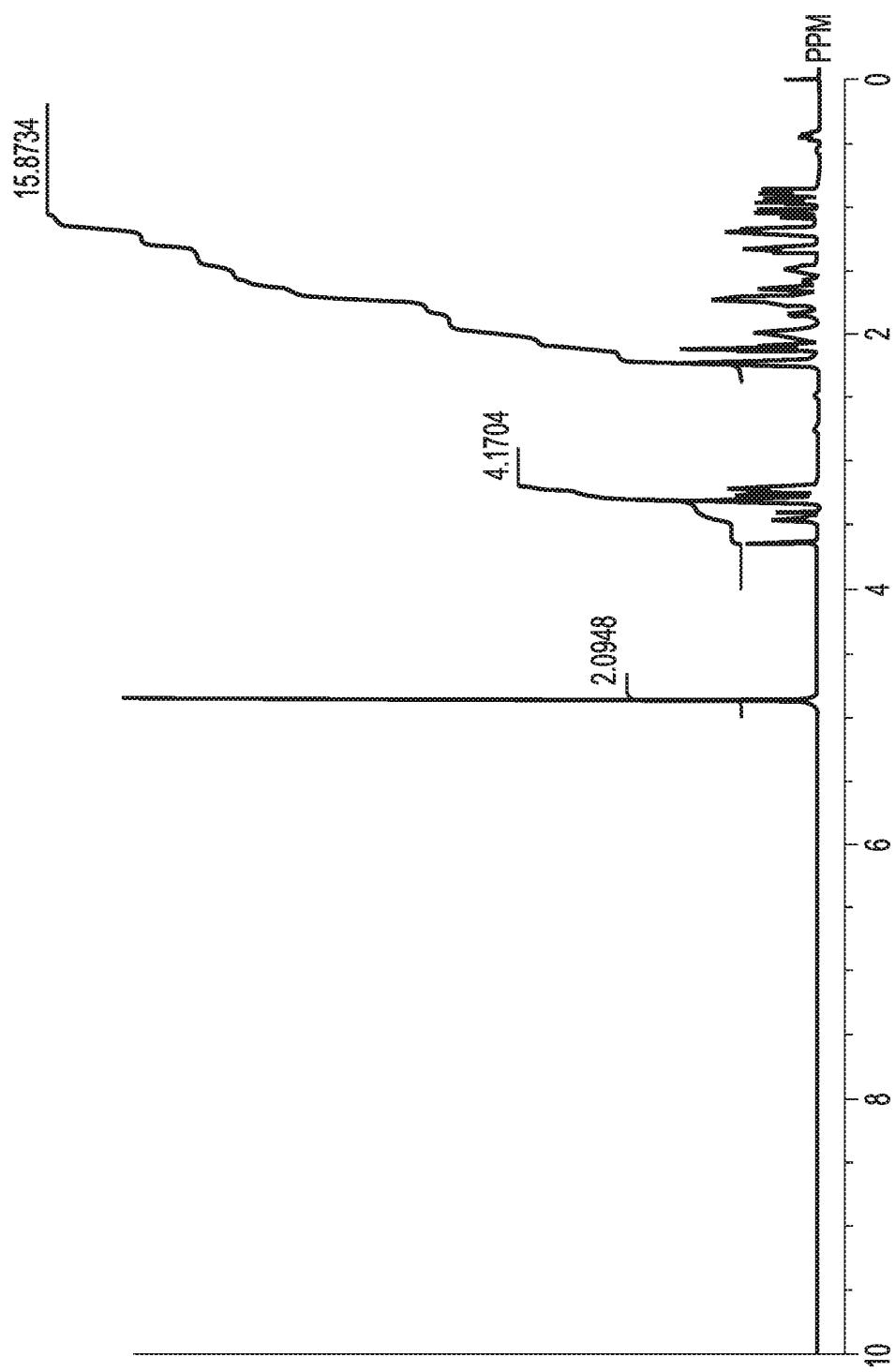
FIG. 1 shows results of the 1H-NMR measurement of the main reaction product obtained in Monomer Synthesis Example 1.

EMBODIMENTS FOR CARRYING OUT THE INVENTION (A) Polycarbonate Resin

The polycarbonate resin of the present invention comprises a structural unit represented by general formula (1) (hereinafter referred to as "the structural unit (1)"). Examples thereof include a structural unit derived from decahydro-1,4:5,8-dimethanonaphthalene diol (sometimes described as "D-NDM"). As described later, the structural unit (1) is obtained by reacting a diol compound represented by general formula (2) with a diester carbonate.

The polycarbonate resin of the present invention may consist of only the structural unit (1), or may also contain another structural unit in addition thereto.

The above-described another structural unit that may be contained is a structural unit obtained by reacting a diol compound other than that of general formula (2) with a diester carbonate. Examples of the diol compound other than that of general formula (2) include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, bisphenol Z, 9,9-bis(4-(2-hydroxyethoxy)phenyl)fluorene, 9,9-bis(4-(2-hydroxyethoxy)-3-methylphenyl)fluorene, 9,9- bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene and 9,9-bis(4-(2-hydroxyethoxy)-3-phenylphenyl)fluorene. Among them, 9,9-bis(4-(2-hydroxyethoxy)-3-phenylphenyl)fluorene is preferred.

The polystyrene equivalent weight-average molecular weight (Mw) of the polycarbonate resin of the present invention is preferably 5,000 to 300,000. The polystyrene equivalent weight-average molecular weight (Mw) is more preferably 30,000 to 120,000. In another preferred embodiment, the polystyrene equivalent weight-average molecular weight (Mw) is preferably 5,000 to 50,000, and more preferably 7,000 to 45,000. Further, the preferred lower limit of the polystyrene equivalent weight-average molecular weight (Mw) is, for example, 35,000 or 41,000. When Mw is less than 5,000, an optical lens becomes fragile, and therefore it is undesirable. When Mw is more than 300,000, the melt viscosity increases, resulting in difficulty in taking out a resin after the production, and in addition, the flowability is reduced, resulting in difficulty in injection molding in a molten state, and therefore it is undesirable.

The reduced viscosity ($\eta sp/C$) of the polycarbonate resin of the present invention is 0.20 dl/g or more, and preferably 0.23 to 0.84 dl/g.

Moreover, to the polycarbonate resin of the present invention, an antioxidant, a mold release agent, an ultraviolet absorber, a flowability improving agent, a crystal nucleating agent, a toughening agent, a dye, an antistatic agent, an antimicrobial agent or the like is preferably added.

(B) Method for Producing the Diol Compound Represented by General Formula (2)

The diol compound represented by general formula (2) can be synthesized, for example, by a route shown in formula (3) below using, as raw materials, dicyclopentadiene or cyclopentadiene and an olefin having a functional group.

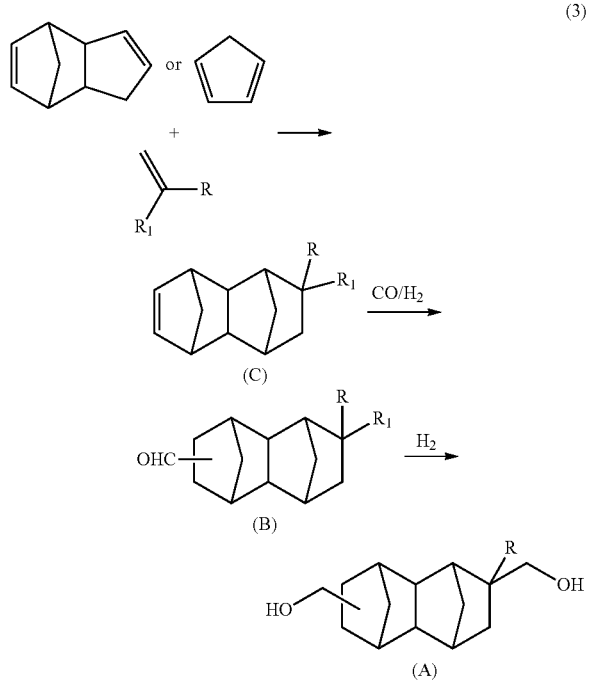

(3)

(In formula (3): R represents H, $CH_3$ or $C_2H_5$; and $R_1$ represents $COOCH_3$, $COOC_2H_5$, $COOC_3H_7$, $COOC_4H_9$ or CHO.)

[Production of $C_{13-19}$ Monoolefin Represented by Formula (C)]

The $C_{13-19}$ monoolefin represented by formula (C) can be produced by performing a Diels-Alder reaction of an olefin having a functional group with dicyclopentadiene.

Examples of the olefin having a functional group to be used for the Diels-Alder reaction include methyl methacrylate, ethyl methacrylate, propyl methacrylate, butyl methacrylate, methyl acrylate, ethyl acrylate, propyl acrylate, butyl acrylate, methacrolein and acrolein. More preferred examples of the olefin include methyl methacrylate, ethyl methacrylate, methyl acrylate, ethyl acrylate, methacrolein and acrolein.

The dicyclopentadiene to be used for the Diels-Alder reaction preferably has a high purity, and it is desirable that inclusion of butadiene, isoprene, etc. is avoided as much as possible. The purity of the dicyclopentadiene is more preferably 90% or more, and even more preferably 95% or more. Further, since it is known that dicyclopentadiene is depolymerized under heating conditions to obtain cyclopentadiene (so-called "monocyclopentadiene"), it is also possible to use cyclopentadiene instead of dicyclopentadiene. Note that it is considered that the $C_{13-19}$ monoolefin represented by formula (C) is substantially produced via a $C_{8-14}$ monoolefin represented by formula (4) below (first-stage Diels-Alder reaction product), and that the produced monoolefin represented by formula (4), as a new parent diene compound (Dienophile), and cyclopentadiene (Diene) existing in the reaction system are reacted in the Diels-Alder reaction (second-stage Diels-Alder reaction) to produce the $C_{13-19}$ monoolefin represented by formula (C).

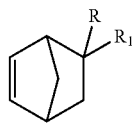

(4)

(In the formula: R represents H, $CH_3$ or $C_2H_5$; and $R_1$ represents $COOCH_3$, $COOC_2H_5$, $COOC_3H_7$, $COOC_4H_9$ or CHO.)

For efficient progress of the Diels-Alder reaction having the 2 stages, existence of cyclopentadiene in the reaction system is important. For this reason, the reaction temperature is preferably 100° C. or higher, more preferably 120° C. or higher, and particularly preferably 130° C. or higher. Meanwhile, for suppressing by-production of a high-boiling substance, the reaction is preferably performed at 250° C. or lower. Further, as a reaction solvent, hydrocarbons, alcohols, esters, etc. can be used, and preferred are aliphatic hydrocarbons having 6 or more carbon atoms, cyclohexane, toluene, xylene, ethylbenzene, mesitylene, propanol, butanol, etc.

As the reaction method of the Diels-Alder reaction, various reaction methods can be employed, and examples thereof include: the batch method using a tank reactor or the like; the semibatch method in which a substrate or substrate solution is supplied to a tank reactor under reaction conditions; and the continuous flow method in which substrates are flowed through a tube reactor under reaction conditions.

The reaction product obtained by the Diels-Alder reaction can be directly used as a raw material for the next hydroformylation reaction, but may also be purified by means of distillation, extraction, crystallization or the like and then used in the next process.

[Production of $C_{14-20}$ Bifunctional Compound Represented by Formula (B)]

The $C_{14-20}$ bifunctional compound represented by formula (B) in the aforementioned formula (3) can be produced by subjecting the $C_{13-19}$ monoolefin represented by formula (C), carbon monoxide and hydrogen gas to a hydroformylation reaction in the presence of a rhodium compound and an organic phosphorous compound.

Regarding the rhodium compound to be used for the hydroformylation reaction, the form of a precursor thereof is not limited as long as the rhodium compound is a compound which forms a complex together with the organic phosphorous compound and exhibits hydroformylation activity in the presence of carbon monoxide and hydrogen. A catalyst precursor such as rhodium acetylacetonate dicarbonyl (hereinafter described as "Rh(acac)(CO)$_2$"), Rh$_2$O$_3$, Rh$_4$(CO)$_{12}$, Rh$_6$(CO)$_{16}$ and Rh(NO$_3$)$_3$ may be introduced into a reaction mixture together with the organic phosphorous compound to form a rhodium metal hydridocarbonyl phosphorous complex having catalytic activity in a reaction container. Alternatively, the rhodium metal hydridocarbonyl phosphorous complex may be prepared in advance to be subsequently introduced into a reactor. Preferred specific examples include a method in which Rh(acac)(CO)$_2$ is reacted with the organic phosphorous compound in the presence of a solvent and then it is introduced into a reactor together with an excess of the organic phosphorous compound to obtain a rhodium-organic phosphorous complex having catalytic activity.

It was a surprise for the present inventors that a second-stage Diels-Alder reaction product having an internal olefin with a relatively high molecular weight as represented by formula (C) was hydroformylated by a slight amount of a rhodium catalyst. The amount of the rhodium compound to be used for the hydroformylation reaction is preferably 0.1 to 30 μmol, more preferably 0.2 to 20 μmol, and even more preferably 0.5 to 10 μmol relative to 1 mol of the $C_{13-19}$ monoolefin represented by formula (C) that is the substrate of the hydroformylation reaction. When the amount of the rhodium compound to be used is less than 30 μmol relative to 1 mol of the $C_{13-19}$ monoolefin, the cost of the rhodium catalyst can be reduced without providing equipments for recovery/recycling of rhodium complexes, and therefore economic burden related to equipments for recovery/recycling can be reduced.

Regarding the hydroformylation reaction, examples of the organic phosphorous compound which forms a catalyst of the hydroformylation reaction together with the rhodium compound include a phosphine represented by general formula P(—R$_1$)(—R$_2$)(—R$_3$) and a phosphite represented by P(—OR$_1$)(—OR$_2$)(—OR$_3$). Specific examples of R$_1$, R$_2$ and R$_3$ include an aryl group, which may be substituted with a $C_{1-4}$ alkyl group or alkoxy group, and an alicyclic alkyl group, which may be substituted with a $C_{1-4}$ alkyl group or alkoxy group, and preferably used are triphenyl phosphine and triphenyl phosphite. The amount of the organic phosphorous compound to be used is preferably 500 to 10000 times, more preferably 700 to 5000 times, and even more preferably 900 to 2000 times the molar quantity of the rhodium metal. When the amount of the organic phosphorous compound to be used is less than 500 times the molar quantity of the rhodium metal, the stability of the rhodium metal hydridocarbonyl phosphorous complex that is a catalyst active material is impaired, which may result in, for example, slowing of the reaction progress, and therefore it is undesirable. When the amount of the organic phosphorous compound to be used is more than 10000 times the molar quantity of the rhodium metal, the cost related to the organic phosphorous compound increases, and therefore it is undesirable.

The hydroformylation reaction can be performed without use of a solvent, but can be more suitably performed by use of a reaction-inert solvent. The solvent is not particularly limited as long as it dissolves the $C_{13-19}$ monoolefin represented by formula (C), and dicyclopentadiene or cyclopentadiene, and the rhodium compound and the organic phosphorous compound. Specific examples of the solvent include: hydrocarbons such as aliphatic hydrocarbon, alicyclic hydrocarbon and aromatic hydrocarbon; esters such as aliphatic ester, alicyclic ester and aromatic ester; alcohols such as aliphatic alcohol and alicyclic alcohol; and aromatic halide. Among them, hydrocarbons are preferably used, and among them, alicyclic hydrocarbon and aromatic hydrocarbon are particularly preferably used.

The temperature at the time of performing the hydroformylation reaction is preferably 40° C. to 160° C., and more preferably 80° C. to 140° C. When the reaction temperature is 40° C. or higher, a sufficient reaction rate is obtained, and remaining of the monoolefin as the raw material can be suppressed. Further, when the reaction temperature is 160° C. or lower, the production of by-products derived from the raw material monoolefin and reaction product can be suppressed to prevent reduction in reaction performance.

When performing the hydroformylation reaction, it is required to perform the reaction under elevated pressure using carbon monoxide (hereinafter sometimes described as "CO") and hydrogen (hereinafter sometimes described as "H$_2$") gas. CO and H$_2$ gas can be each independently introduced into the reaction system. Alternatively, a mixed gas thereof can be prepared in advance to be introduced into the reaction system. The molar ratio between CO and H$_2$ gas to be introduced into the reaction system (=CO/H$_2$) is preferably 0.2 to 5, more preferably 0.5 to 2, and even more preferably 0.8 to 1.2. When the molar ratio between CO and H$_2$ gas is not within the range, the reaction activity of the hydroformylation reaction and the selectivity of aldehyde as the target may be reduced. The amount of CO and H$_2$ gas introduced into the reaction system decreases as the reaction proceeds. Therefore, when utilizing a mixed gas of CO and H$_2$ prepared in advance, the reaction may be conveniently controlled.

The reaction pressure of the hydroformylation reaction is preferably 1 to 12 MPa, more preferably 1.2 to 9 MPa, and even more preferably 1.5 to 5 MPa. When the reaction pressure is 1 MPa or more, a sufficient reaction rate is obtained, and remaining of the monoolefin as the raw material can be suppressed. Further, when the reaction pressure is 12 MPa or less, expensive equipments having excellent pressure resistance are no longer required, and therefore it is economically advantageous. In particular, in the case of performing the reaction by the batch method or semibatch method, it is required to discharge CO and H$_2$ gas to reduce the pressure after the reaction is completed, and the lower the pressure is, the smaller the loss of CO and H$_2$ gas is, and therefore it is economically advantageous.

As the reaction method for performing the hydroformylation reaction, the batch reaction or the semibatch reaction is preferably employed. The semibatch reaction can be performed by putting the rhodium compound, the organic phosphorous compound and the solvent into a reactor, carrying out pressurization with CO/H$_2$ gas, heating, etc. to obtain the already-described reaction conditions, and then by supplying the monoolefin as the raw material or a solution thereof to the reactor.

The reaction product obtained by the hydroformylation reaction can be directly used as a raw material for the next reduction reaction, but may also be purified by means of distillation, extraction, crystallization or the like and then used in the next process.

[Production of $C_{14-16}$ Bifunctional Compound Represented by Formula (A)]

The $C_{14-16}$ bifunctional compound represented by formula (A) in the aforementioned formula (3) can be produced by reducing the $C_{14-20}$ bifunctional compound represented by formula (B) in the presence of a catalyst having hydrogenation ability and hydrogen.

In the reduction reaction, as the catalyst having hydrogenation ability, a catalyst comprising at least one element selected from the group consisting of copper, chromium, iron, zinc, aluminium, nickel, cobalt and palladium is used. Examples of the catalyst include a Cu—Cr catalyst, a Cu—Zn catalyst, a Cu—Zn—Al catalyst, a Raney-Ni catalyst and a Raney-Co catalyst.

The amount of the aforementioned hydrogenation catalyst to be used is 1 to 100% by weight, preferably 2 to 50% by weight, and more preferably 5 to 30% by weight relative to the $C_{14-20}$ bifunctional compound represented by formula (B) as the substrate. When the amount of the catalyst to be used is within the range, the hydrogenation reaction can be suitably performed. When the amount of the catalyst to be used is small, the reaction is not completed, and as a result, the yield of the objective substance is reduced. Further, when the amount of the catalyst to be used is large, it is impossible to obtain the effect of improving the reaction rate commensurate with the amount of the catalyst used in the reaction.

The reaction temperature for the reduction reaction is preferably 80 to 250° C., and more preferably 100 to 230° C. When the reaction temperature is 250° C. or lower, occurrence of side reaction and decomposition reaction can be suppressed and the objective substance can be obtained in a high yield. When the reaction temperature is 80° C. or higher, the reaction can be completed with an appropriate amount of time, and reduction in productivity and reduction in the yield of the objective substance can be avoided.

Regarding the reaction pressure of the reduction reaction, the hydrogen partial pressure is preferably 1 to 20 MPa, and more preferably 2 to 15 MPa. When the hydrogen partial pressure is 20 MPa or less, occurrence of side reaction and decomposition reaction can be suppressed and the objective substance can be obtained in a high yield. When the hydrogen partial pressure is 1 MPa or more, the reaction can be completed with an appropriate amount of time, and reduction in productivity and reduction in the yield of the objective substance can be avoided. Note that a gas which is inactive in the reduction reaction (for example, nitrogen or argon) can coexist.

In the reduction reaction, a solvent can be used. As the solvent, aliphatic hydrocarbons, alicyclic hydrocarbons, aromatic hydrocarbons, alcohols, etc. can be used, and among them, preferred are alicyclic hydrocarbons, aromatic hydrocarbons and alcohols. Specific examples thereof include cyclohexane, toluene, xylene, methanol, ethanol and 1-propanol.

As the reaction method of the reduction reaction, various reaction methods can be employed, and examples thereof include: the batch method using a tank reactor or the like; the semibatch method in which a substrate or substrate solution is supplied to a tank reactor under reaction conditions; and the continuous flow method in which a substrate or substrate solution is flowed through a tube reactor filled with a molded catalyst under reaction conditions.

The reaction product obtained by the reduction reaction can be purified by means of distillation, extraction, crystallization or the like.

(C) Method for Producing the Polycarbonate Resin

The polycarbonate resin of the present invention can be produced by the melt polycondensation method using a diol compound represented by general formula (2) and a diester carbonate as raw materials. In the diol compound represented by general formula (2), a mixture of an isomer containing a hydroxymethyl group at 2,6-position and an isomer containing a hydroxymethyl group at 2,7-position is present. Regarding these isomers, the mass ratio of the isomer of 2,6-position: the isomer of 2,7-position is 0.1:99.9 to 99.9:0.1. From the viewpoint of physical properties of the resin such as the strength and tensile elongation of the resin and outer appearance of the molded body, the isomer of 2,6-position: the isomer of 2,7-position is preferably 1.0:99.0 to 99.0:1.0, more preferably 20:80 to 80:20, and particularly preferably 50:50 to 80:20. Moreover, use in combination with another diol compound may also be employed. The production can be carried out by this reaction in the presence of, as a polycondensation catalyst, a basic compound catalyst, a transesterification catalyst or a mixed catalyst made of these two catalysts.

Examples of the diester carbonate include diphenyl carbonate, ditolyl carbonate, bis(chlorophenyl) carbonate, m-cresyl carbonate, dimethyl carbonate, diethyl carbonate, dibutyl carbonate and dicyclohexyl carbonate. Among them, diphenyl carbonate is particularly preferred in terms of the reactivity and purity. The diester carbonate is used at a ratio of preferably 0.97 to 1.20 mol, and more preferably 0.98 to 1.10 mol relative to 1 mol of the diol component. By adjusting this molar ratio, the molecular weight of the polycarbonate resin is controlled.

Examples of the basic compound catalyst include an alkali metal compound, an alkaline earth metal compound and a nitrogen-containing compound.

Examples of the alkali metal compound to be used in the present invention include an organic salt, inorganic salt, oxide, hydroxide, hydride or alkoxide of an alkali metal, etc. Specific examples thereof include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylboron, sodium benzoate, potassium benzoate, cesium benzoate, lithium benzoate, disodium hydrogen phosphate, dipotassium hydrogen phosphate, dilithium hydrogen phosphate, disodium phenyl phosphate, a disodium salt, dipotassium salt, dicesium salt or dilithium salt of bisphenol A, and a sodium salt, potassium salt, cesium salt or lithium salt of phenol. From the viewpoint of the catalytic effect, price, distribution amount, influence on color phase of resin, etc., sodium carbonate and sodium hydrogen carbonate are preferred.

Examples of the alkaline earth metal compound include an organic salt, inorganic salt, oxide, hydroxide, hydride or alkoxide of an alkaline earth metal compound, etc. Specific examples thereof include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenyl phosphate.

Examples of the nitrogen-containing compound include quaternary ammonium hydroxides and salts thereof, and amines. Specific examples thereof include: quaternary ammonium hydroxides having an alkyl group, aryl group or the like such as tetramethylammonium hydroxide, tetraethylammonium hydroxide, tetrapropylammonium hydroxide, tetrabutylammonium hydroxide and trimethylbenzylammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; and bases or basic salts such as ammonia, tetramethylammonium borohydride, tetrabutylammonium borohydride, tetrabutylammonium tetraphenylborate and tetraphenylammonium tetraphenylborate.

As the transesterification catalyst, salts of zinc, tin, zirconium and lead are preferably used. These substances may be used solely, or two or more of them may be used in combination. Moreover, these substances may be used in combination with the above-described alkali metal compound or alkaline earth metal compound.

As the transesterification catalyst, zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonato, zirconium oxyacetate, zirconium tetrabutoxide, lead(II) acetate, lead(IV) acetate or the like is specifically used.

These catalysts are used at a ratio of $1 \times 10^{-9}$ to $1 \times 10^{-3}$ mol, and preferably $1 \times 10^{-7}$ to $1 \times 10^{-4}$ mol relative to 1 mol of the total of the diol compound.

In the melt polycondensation method, using the aforementioned raw materials and catalyst, melt polycondensation is carried out while removing a by-product by means of the transesterification reaction under heating conditions and under ordinary pressure or reduced pressure. The reaction is generally performed with two or more stages.

Specifically, the first-stage reaction is performed at 120 to 260° C., and preferably 180 to 240° C., and for 0.1 to 5 hours, and preferably 0.5 to 3 hours. Subsequently, the pressure reducing degree of the reaction system is increased while increasing the reaction temperature to react the diol compound with the diester carbonate, and finally, a polycondensation reaction is performed under a reduced pressure of 1 mmHg or less at 200 to 350° C. for 0.05 to 2 hours. The reaction may be either a continuous type or a batch type. The reaction apparatus to be used for performing the reaction may be a vertical apparatus equipped with an anchor type stirring blade, maxblend stirring blade, helicalribbon type stirring blade or the like, or a horizontal apparatus equipped with a paddle blade, lattice blade, spectacle-shaped blade or the like, or an extruder-type apparatus equipped with a screw. Further, use of these reaction apparatuses in combination is suitably carried out in consideration of the viscosity of a polymerized product.

In the method for producing the polycarbonate resin of the present invention, after the polymerization reaction is completed, in order to maintain thermal stability and hydrolytic stability, the catalyst may be removed or deactivated. In general, a method for deactivating a catalyst by means of addition of a publicly-known acidic substance is suitably carried out. As such substances, specifically, esters such as butyl benzoate; aromatic sulfonic acids such as p-toluenesulfonic acid; aromatic sulfonic acid esters such as butyl p-toluenesulfonate and hexyl p-toluenesulfonate; phosphoric acids such as phosphorous acid, phosphoric acid and phosphonic acid; phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite and monooctyl phosphite; phosphoric acid esters such as triphenyl phosphate, diphenyl phosphate, monophenyl phosphate, dibutyl phosphate, dioctyl phosphate and monooctyl phosphate; phosphonic acids such as diphenylphosphonic acid, dioctylphosphonic acid and dibutylphosphonic acid; phosphonic acid esters such as diethyl phenylphosphonate; phosphines such as triphenyl phosphine and bis(diphenylphosphino)ethane; boric acids such as boric acid and phenylboric acid; aromatic sulfonates such as dodecylbenzenesulfonic acid tetrabutylphosphonium salt; organic halides such as stearic acid chloride, benzoyl chloride and p-toluenesulfonic acid chloride; alkyl sulfates such as dimethyl sulfate; organic halides such as benzyl chloride; etc. are preferably used. From the viewpoint of the deactivating effect, color phase of the resin and stability, butyl p-toluenesulfonate is preferably used. These deactivating agents are used in an amount of 0.01 to 50 times, and preferably 0.3 to 20 times the molar quantity of the catalyst. When the amount is less than 0.01 times the molar quantity of the catalyst, the deactivating effect is insufficient and therefore it is undesirable. When the amount is more than 50 times the molar quantity of the catalyst, heat resistance is reduced and a molded body tends to be easily colored, and therefore it is undesirable.

After the catalyst is deactivated, a process of devolatilizing and removing a low boiling point compound in the polymer under a pressure of 0.1 to 1 mmHg and at a temperature of 200 to 350° C. may be carried out. In this process, a horizontal apparatus equipped with a stirring blade having excellent surface renewal ability such as a paddle blade, a lattice blade and a spectacle-shaped blade, or a thin film evaporator is suitably used.

It is desired that the content of foreign materials in the polycarbonate resin of the present invention is as small as possible, and filtration of a melting raw material and filtration of a catalyst solution are suitably carried out. The mesh of the filter is preferably 5 µm or less, and more preferably 1 µm or less. Moreover, filtration of the produced resin using a polymer filter is suitably carried out. The mesh of the polymer filter is preferably 100 µm or less, and more preferably 30 µm or less. Further, the process of obtaining a resin pellet should definitely be carried out in a low-dust environment, which is preferably Class 1000 or lower, and more preferably Class 100 or lower.

(D) Physical Properties of the Polycarbonate Resin

The optical lens of the present invention has a high Abbe number, high transparency, appropriate water absorption coefficient and appropriate hygroscopic expansion coefficient.

Further, the glass transition temperature (Tg) of the polycarbonate resin of the present invention is preferably 95 to 180° C., more preferably 110 to 160° C., and particularly preferably 120 to 160° C. The preferred lower limit of the glass transition temperature (Tg) is, for example, 130° C. or 140° C., and the preferred upper limit of the glass transition temperature (Tg) is, for example, 150° C. When Tg is lower than 95° C., the range of the operating temperature of lenses and cameras is narrowed, and therefore it is undesirable.

When Tg is higher than 180° C., molding conditions at the time of injection molding become more strict, and therefore it is undesirable.

The polycarbonate resin of the present invention has a refractive index, which is measured after molding according to the method of JIS-K-7142, of preferably 1.50 to 1.65, and more preferably 1.52 to 1.55.

The polycarbonate resin of the present invention has an Abbe number, which is measured after molding according to the method of JIS-K-7142, of 25 or more, preferably 40 or more, and more preferably 50 or more. The upper limit of the Abbe number is about 60.

The polycarbonate resin of the present invention has a total light transmittance, which is measured after molding by integrating-sphere photoelectric photometry, of 85.0% or higher, and preferably 87.0% or higher. The upper limit of the total light transmittance is about 99%.

The polycarbonate resin of the present invention has a water absorption coefficient, which is measured according to the method of JIS-K-7209, of preferably 0.2 to 0.5%, and more preferably 0.3 to 0.4%.

The hygroscopic expansion coefficient of the polycarbonate resin of the present invention is preferably 0.01 to 0.5%, and more preferably 0.03 to 0.4%.

The measurement of the hygroscopic expansion coefficient is carried out using a micrometer (accuracy: 1/1000 mm). The diameter of a circular plate for use in the measurement of the water absorption coefficient is measured, and the rate of change of the diameter before and after water absorption (%) is regarded as the hygroscopic expansion coefficient.

(E) Optical Lens

The optical lens of the present invention can be obtained by injection-molding the above-described polycarbonate resin of the present invention into a lens shape using an injection molding machine or injection compression molding machine. The molding conditions for injection molding are not particularly limited, but the molding temperature is preferably 180 to 280° C., and the injection pressure is preferably 50 to 1700 kg/cm².

In order to avoid mixing of a foreign material in the optical lens as much as possible, the molding environment must be a low-dust environment, and it is preferably Class 1000 or lower, and more preferably Class 100 or lower.

The optical lens of the present invention is preferably used in the form of an aspherical lens according to need. In the case of the aspherical lens, since the spherical aberration can be adjusted to be substantially zero by one lens, it is not necessary to remove the spherical aberration by combining a plurality of spherical lenses, and reduction in weight and reduction in the production cost can be carried out. Accordingly, the aspherical lens is particularly useful as a camera lens among optical lenses. The astigmatism of the aspherical lens is preferably 0 to 15 mλ, and more preferably 0 to 10 mλ.

The thickness of the optical lens of the present invention can be set in a wide range depending on intended uses and is not particularly limited, but is preferably 0.01 to 30 mm, and more preferably 0.1 to 15 mm. To the surface of the optical lens of the present invention, a coat layer such as an antireflection layer, a hard coat layer or the like may be provided according to need. The antireflection layer may be either a single layer or a multilayer, and may be made of either an organic substance or an inorganic substance, but preferably made of an inorganic substance. Specific examples thereof include oxides and fluorides such as silicon oxide, aluminium oxide, zirconium oxide, titanium oxide, cerium oxide, magnesium oxide and magnesium fluoride. Among them, more preferred are silicon oxide and zirconium oxide, and even more preferred is a combination of silicon oxide and zirconium oxide. Regarding the antireflection layer, the combination of single layer(s)/multilayer(s), components thereof, the combination of thicknesses, etc. are not particularly limited, but the antireflection layer preferably has a two-layer structure or three-layer structure, and particularly preferably has a three-layer structure. Preferably, the thickness of the entire antireflection layer to be formed is 0.00017 to 3.3% of the thickness of the optical lens, specifically, 0.05 to 3 µm, and particularly preferably 1 to 2 µm.

EXAMPLES

Hereinafter, the present invention will be specifically described by way of examples, but the present invention is not limited thereto. Note that measurement values in the Examples were measured using the below-described methods and apparatuses.

1) Polystyrene equivalent weight-average molecular weight (Mw): Using GPC and tetrahydrofuran as a developing solvent, a calibration curve was produced using a standard polystyrene having an already-known molecular weight (molecular weight distribution=1). Based on this calibration curve, Mw was calculated from the GPC retention time.

2) Glass transition temperature (Tg): It was measured using a differential scanning calorimeter (DSC).

3) Refractive index (nD), Abbe number (vD): The polycarbonate resin was press-molded into a circular plate (40 φ, thickness: 3 mm) (molding conditions: 200° C., 100 kgf/cm², 2 minutes). It was cut at right angles to be measured with Kalnew KPR-200.

4) Total light transmittance: The measurement was carried out using MODEL1001 DP manufactured by Nippon Denshoku Industries Co., Ltd. Note that the total light transmittance of a circular plate obtained by press molding (thickness: 3 mm) was measured.

5) Saturated water absorption coefficient: The measurement was carried out using a circular plate obtained by press molding (thickness: 3 mm) according to JIS-K-7209.

6) Hygroscopic expansion coefficient

Using the sample used for the measurement of the water absorption coefficient, the diameter thereof was measured before and after water absorption by a micrometer (manufactured by Mitutoyo, accuracy: 1/1000 mm). The rate of change of the diameter (%) was calculated from the following mathematical formula (1):

Hygroscopic expansion coefficient at the time of saturation={(diameter of circular plate at the time of saturated water absorption)−(diameter of circular plate before measuring water absorption coefficient)}×100/(diameter of circular plate before measuring water absorption coefficient)     Mathematical formula (1)

<Monomer Synthesis Example 1>

173 g (2.01 mol) of methyl acrylate and 167 g (1.26 mol) of dicyclopentadiene were put into a 500 ml stainless steel reactor, and the mixture was reacted at 195° C. for 2 hours. A reaction solution containing 96 g of a monoolefin represented by formula (3a) below was obtained, and this was purified by distillation, and after that, a part of the product was used in the subsequent-stage reaction.

With a 300 ml stainless steel reactor, the hydroformylation reaction of the monoolefin represented by formula (3a) purified by distillation was performed using a CO/$H_2$ mixed gas (molar ratio of CO/$H_2$=1). 70 g of the monoolefin represented by formula (3a), 140 g of toluene, 0.50 g of triphenyl phosphite and 550 µl of a toluene solution of Rh(acac)(CO)$_2$ separately prepared (concentration: 0.003 mol/L) were put into the reactor. Substitution with nitrogen and substitution with the CO/$H_2$ mixed gas were respectively performed 3 times. After that, the inside of the system was pressurized with the CO/$H_2$ mixed gas, and the reaction was performed at 100° C. and 2 MPa for 5 hours. After the reaction was completed, gas chromatography analysis of the reaction solution was carried out to confirm that it is a reaction solution containing 76 g of a bifunctional compound represented by formula (2a) below and 1.4 g of the monoolefin represented by formula (3a) (conversion rate: 98%, selectivity: 97%). Subsequently, this was purified by distillation, and after that, a part of the product was used in the subsequent-stage reaction.

50 g of the bifunctional compound represented by formula (2a) purified by distillation, 10 g of a Cu—Zn—Al catalyst (E-01X manufactured by JGC Catalysts and Chemicals Ltd.) and 150 g of toluene were put into a 300 ml stainless steel reactor. The inside of the system was pressurized with hydrogen gas, and the reaction was performed at 10 MPa and 215° C. for 8 hours. After the reaction, the obtained slurry was diluted with methanol and the catalyst was filtered using a membrane filter having a pore diameter of 0.2 µm. After that, the solvent was distilled away using an evaporator, and gas chromatography analysis and GC-MS analysis were carried out to confirm that 43 g of the main product having a molecular weight of 222 was contained (yield of the main product: 96%). This was further purified by distillation to obtain the main product.

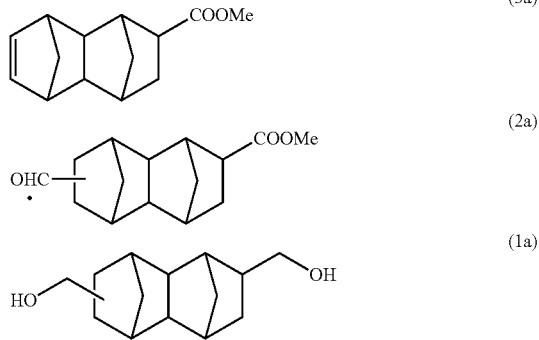

(In the formula, Me represents a methyl group.)
<Identification of Product>

Figure 2:
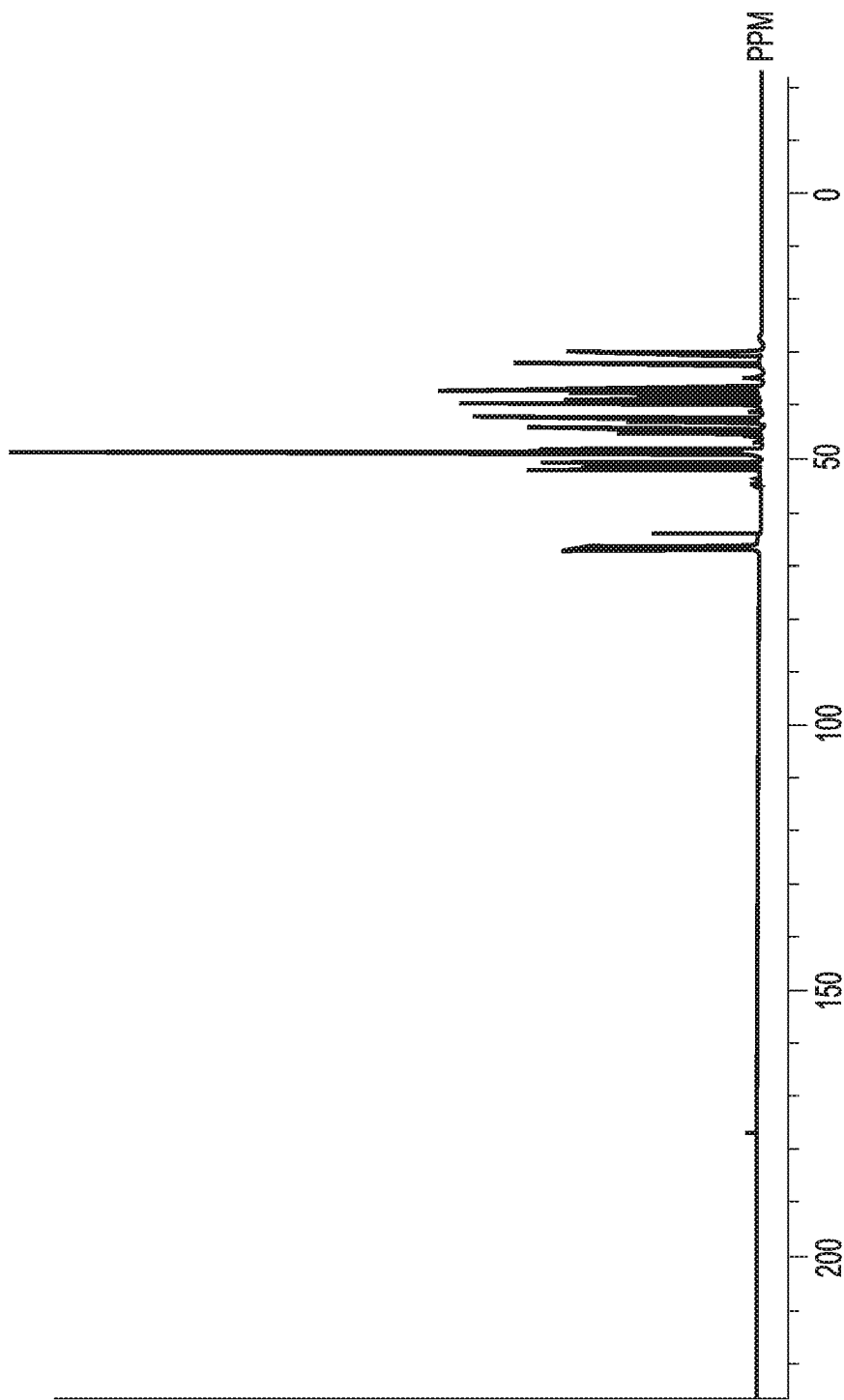
FIG. 2 shows results of the 13C-NMR measurement of the main reaction product obtained in Monomer Synthesis Example 1.
Figure 3:
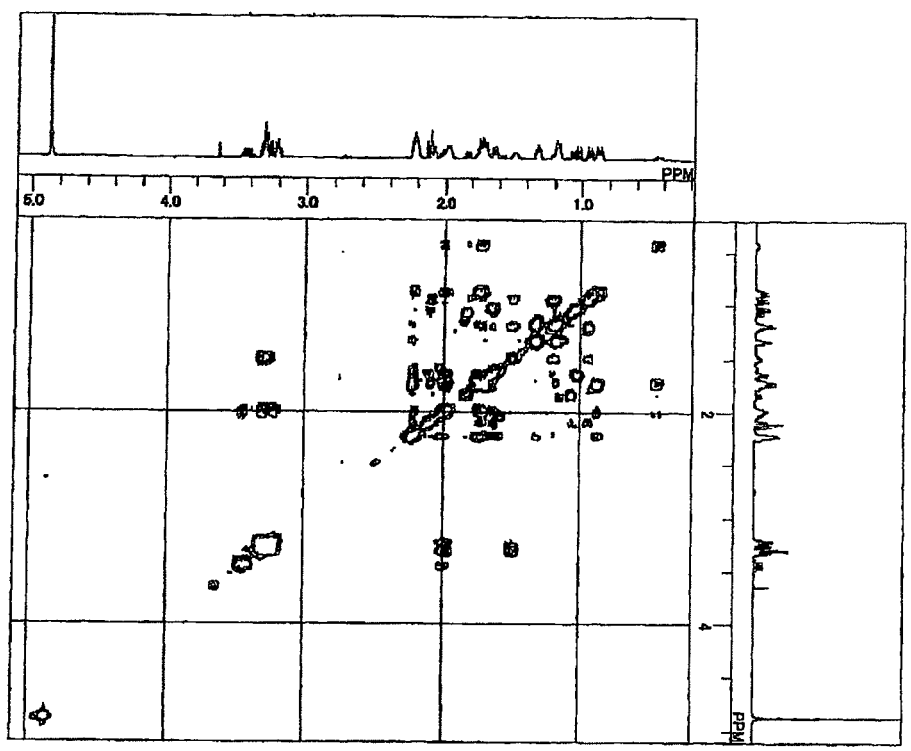
FIG. 3 shows results of the COSY-NMR measurement of the main reaction product obtained in Monomer Synthesis Example 1.

NMR analysis, gas chromatography analysis and GC-MS analysis of the component obtained in Monomer Synthesis Example 1 were carried out. NMR spectra are shown in FIGS. 1 to 3.
1) NMR measurement conditions
Apparatus: JNM-ECA500 (500 MHz) manufactured by JEOL Ltd.
Measurement mode: 1H-NMR, 13C-NMR, COSY-NMR
Solvent: CD$_3$OD (deuterated methanol)
Internal standard substance: tetramethylsilane
2) Gas chromatography measurement conditions
Analyzer: Capillary Gas Chromatograph GC-2010 Plus manufactured by Shimadzu Corporation
Analysis column: InertCap I manufactured by GL Sciences Inc. (30 m, 0.32 mm I.D., film thickness: 0.25 µm)
Temperature of oven: 60° C. (held for 0.5 minute)—increased at 15° C./min-280° C. (held for 4 minutes)
Detector: FID, temperature: 280° C.
3) GC-MS measurement conditions
Analyzer: GCMS-QP2010 Plus manufactured by Shimadzu Corporation
Ionization voltage: 70 eV
Analysis column: DB-1 manufactured by Agilent Technologies (30 m, 0.32 mm I.D., film thickness: 1.00 µm)
Temperature of oven: 60° C. (held for 0.5 minute)—increased at 15° C./min-280° C. (held for 4 minutes)
Temperature of detector: 280° C.

According to GC-MS analysis and the results of NMR analysis shown in FIGS. 1 to 3, it was confirmed that the main product obtained in Monomer Synthesis Example 1 is the diol compound represented by the aforementioned formula (1a) (D-NDM). In addition, according to gas chromatography analysis, it was confirmed that the obtained diol compound is an isomer mixture, which contains an isomer containing a hydroxymethyl group at 2,6-position (76% by mass) and an isomer containing a hydroxymethyl group at 2,7-position (24% by mass).
<Monomer Synthesis Example 2>

A reaction solution containing 86 g of a monoolefin represented by formula (3b) below was obtained using 141 g (1.93 mol/purity: 96%) of methacrolein instead of methyl acrylate of Monomer Synthesis Example 1. This was purified by distillation, and after that, a part of the product was used in the subsequent-stage reaction.

With a 300 ml stainless steel reactor, the hydroformylation reaction of the monoolefin represented by formula (3b) was performed using a CO/$H_2$ mixed gas (molar ratio of CO/$H_2$=1). 70 g of the monoolefin represented by formula (3b), 140 g of toluene, 0.55 g of triphenyl phosphite and 580 µl of a toluene solution of Rh(acac)(CO)$_2$ separately prepared (concentration: 0.003 mol/L) were put into the reactor. Substitution with nitrogen and substitution with the CO/$H_2$ mixed gas were respectively performed 3 times. After that, the inside of the system was pressurized with the CO/$H_2$ mixed gas, and the reaction was performed at 100° C. and 2 MPa for 6 hours. After the reaction was completed, gas chromatography analysis of the reaction solution was carried out. It was confirmed that it is a reaction solution containing 77 g of the bifunctional compound represented by formula (2b) below and 1.3 g of the monoolefin represented by formula (3b) (conversion rate: 98%, selectivity: 98%).

50 g of the bifunctional compound represented by formula (2b) purified by distillation, 150 g of toluene and 10 ml of a Raney cobalt catalyst were put into a 300 ml stainless steel reactor. The inside of the system was pressurized with hydrogen gas, and the reaction was performed at 4 MPa and 100° C. for 5 hours. After the reaction, the obtained slurry was diluted with methanol and the catalyst was filtered using a membrane filter having a pore diameter of 0.2 µm. The solvent was distilled away using an evaporator, and gas chromatography analysis and GC-MS analysis were carried out. It was confirmed that 49 g of the main product having a molecular weight of 236 was contained (yield: 96%).

It was confirmed that the obtained main product is the bifunctional compound represented by formula (1b) below.

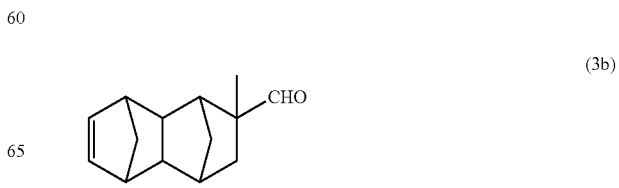

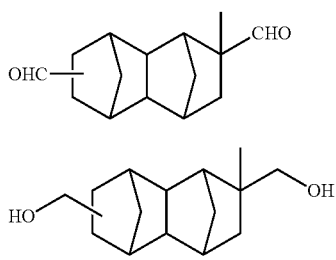

<Monomer Synthesis Example 3>

The monoolefin represented by formula (3a) was synthesized and purified by distillation in a manner similar to that in Monomer Synthesis Example 1.

With a 300 ml stainless steel reactor, the hydroformylation reaction of the monoolefin represented by formula (3a) was performed using a CO/H$_2$ mixed gas (molar ratio of CO/H$_2$=1). 70 g of the monoolefin represented by formula (3a) and 100 g of toluene were put into a stainless steel tank, and substitution with nitrogen and substitution with the CO/H$_2$ mixed gas were respectively performed 3 times. After that, the inside of the system was slightly pressurized with the CO/H$_2$ mixed gas. Separately, 40 g of toluene, 0.13 g of triphenyl phosphite and 120 μl of a toluene solution of Rh(acac)(CO)$_2$ separately prepared (concentration: 0.003 mol/L) were put into a 300 ml stainless steel reactor. Substitution with nitrogen and substitution with the CO/H$_2$ mixed gas were respectively performed 3 times. After that, the inside of the system was pressurized with the CO/H$_2$ mixed gas and held at 100° C. and 2 MPa. From the aforementioned stainless steel tank, the toluene solution of the monoolefin represented by formula (3a) was supplied to the reactor over 2 hours (during this, the reactor was controlled at 100° C. and 2 MPa). After the supply was completed, the mixture was matured at 100° C. and 2 MPa for 3 hours. After the reaction was completed, gas chromatography analysis of the reaction solution was carried out. It was confirmed that it is a reaction solution containing 78 g of the bifunctional compound represented by formula (2a) and 0.73 g of the monoolefin represented by formula (3a) (conversion rate: 99%, selectivity: 99%).

In a manner similar to that in Monomer Synthesis Example 1, the reduction reaction was performed using the diol compound represented by formula (2a) as the raw material (reaction yield: 96%), and the obtained product was further subjected to purification by distillation, thereby obtaining the diol compound represented by formula (1a) (D-NDM). According to gas chromatography analysis, it was confirmed that the obtained diol compound is an isomer mixture, which contains an isomer containing a hydroxymethyl group at 2,6-position (52% by mass) and an isomer containing a hydroxymethyl group at 2,7-position (48% by mass).

<Monomer Synthesis Example 4>

A reaction solution containing 14 g of a monoolefin represented by formula (3c) below was obtained using 52 g (0.61 mol/purity: 99%) of ethylacrolein instead of methyl acrylate of Monomer Synthesis Example 1. The reaction was performed twice, and after purification by distillation, a part of the product was used in the subsequent-stage reaction.

With a 300 ml stainless steel reactor, the hydroformylation reaction of the monoolefin represented by formula (3c) was performed using a CO/H$_2$ mixed gas (molar ratio of CO/H$_2$=1). 21.3 g of the monoolefin represented by formula (3c), 20 g of toluene, 518 mg of triphenyl phosphine and 128 μl of a toluene solution of Rh(acac)(CO)$_2$ separately prepared (concentration: 0.0384 mol/L) were put into the reactor. Substitution with nitrogen and substitution with the CO/H$_2$ mixed gas were respectively performed 3 times. After that, the inside of the system was pressurized with the CO/H$_2$ mixed gas, and the reaction was performed at 110° C. and 2 MPa for 1.5 hours. After the reaction was completed, gas chromatography analysis of the reaction solution was carried out under the above-described conditions. As a result, it was confirmed that it is a reaction solution containing 23.8 g of the bifunctional compound represented by formula (2c) below (yield; 98%).

The reaction solution containing 22.7 g of the bifunctional compound represented by formula (2c), 38 g of cyclohexanol and 2.2 g of a Cu—Zn—Al catalyst (E-01X manufactured by JGC Catalysts and Chemicals Ltd.) were put into a 300 ml stainless steel reactor. The inside of the system was pressurized with hydrogen gas, and the reaction was performed at 3 MPa and 140° C. for 1.5 hours. After the reaction, the obtained slurry was diluted with methanol and the catalyst was filtered using a membrane filter having a pore diameter of 0.2 μm. The solvent was distilled away using an evaporator, and gas chromatography analysis and GC-MS analysis were carried out under the above-described conditions. According to GC-MS analysis, it was confirmed that the obtained main product is a bifunctional compound represented by formula (1c). Further, it was also confirmed that the amount of the bifunctional compound represented by formula (1c) produced is 22 g (yield: 96%).

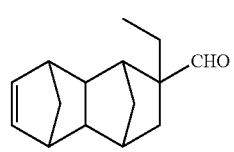

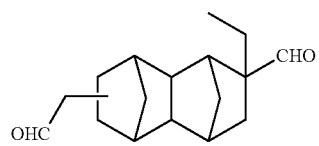

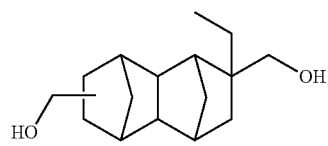

Example 1

23.53 g (0.106 mol) of D-NDM represented by formula (1a) obtained in Monomer Synthesis Example 1, 23.02 g (0.107 mol) of diphenyl carbonate and 0.07 mg (0.8 μmol) of sodium hydrogencarbonate were put into a 300 mL reactor equipped with a stirrer and a distillation apparatus, and it was heated to 215° C. over 1 hour under nitrogen atmosphere (760 Torr) and stirred. Heating was carried out in oil bath, and a transesterification reaction was initiated when the temperature reached 200° C. 5 minutes after the initiation of the reaction, stirring was started, and 20 minutes later, the pressure was reduced from 760 Torr to 200 Torr over 10 minutes. The temperature was increased to 210° C. while reducing the pressure, and increased to reach 220° C. 70 minutes after the initiation of the reaction. 80 minutes after the initiation of the reaction, the pressure was reduced to 150 Torr over 30 minutes, and the temperature was increased to 240° C. while reducing the pressure to 1 Torr. After that, it was kept for 10 minutes, thereby obtaining a polycarbonate resin.

Regarding the obtained polycarbonate resin, Mw was 8,000 and Tg was 110° C. The refractive index of the polycarbonate resin was 1.536, and the Abbe number was 55.2. The total light transmittance was 90%. Further, the saturated water absorption coefficient was 0.38%, and the hygroscopic expansion coefficient at the time of saturation was 0.038%. The results are shown in Tables 1 and 2.

Example 2

23.20 g (0.104 mol) of D-NDM represented by formula (1a) obtained in Monomer Synthesis Example 1, 22.62 g (0.106 mol) of diphenyl carbonate and 0.26 mg (3.1 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate resin. Regarding the obtained polycarbonate resin, Mw was 15,000 and Tg was 127° C. The refractive index was 1.534, and the Abbe number was 56.0. The total light transmittance was 90%. Further, the saturated water absorption coefficient was 0.34%, and the hygroscopic expansion coefficient at the time of saturation was 0.036%.

Example 3

30.9 g (0.139 mol) of D-NDM represented by formula (1a) obtained in Monomer Synthesis Example 1, 29.8 g (0.139 mol) of diphenyl carbonate and 0.09 mg (1.1 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate resin. Regarding the obtained polycarbonate resin, Mw was 42,000 and Tg was 141° C. The refractive index was 1.531, and the Abbe number was 57.3. The total light transmittance was 90%. Further, the saturated water absorption coefficient was 0.35%, and the hygroscopic expansion coefficient at the time of saturation was 0.033%.

Figure 4:
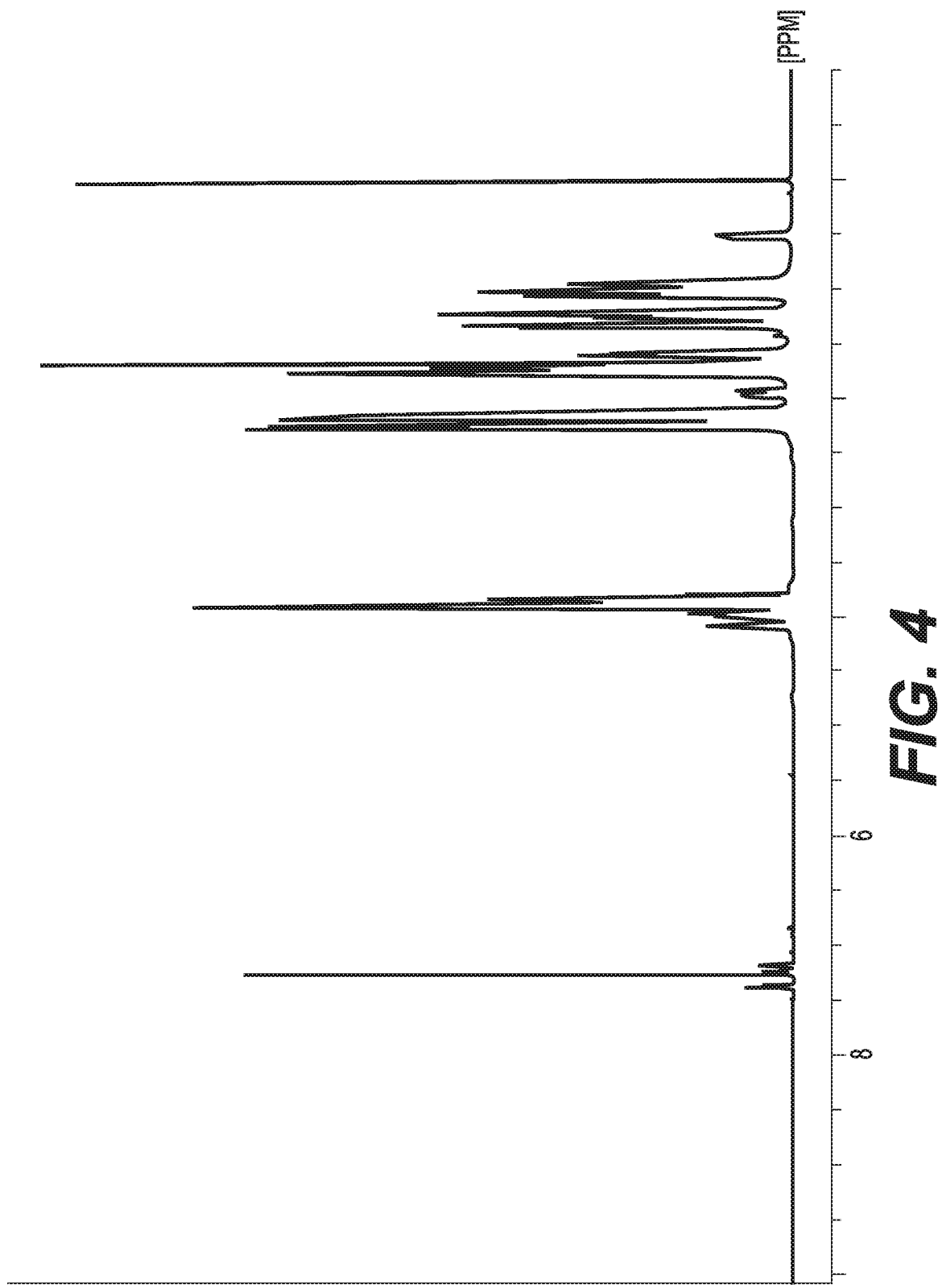
FIG. 4 shows results of the 1H-NMR measurement of the polycarbonate resin obtained in Example 3.

NMR analysis of the obtained polycarbonate resin was carried out under the below-described measurement conditions. The NMR spectrum is shown in FIG. 4. NMR measurement conditions
Apparatus: JNM-ECA500 (500 MHz) manufactured by JEOL Ltd.
Measurement mode: 1H-NMR
Solvent: deuterochloroform
Internal standard substance: tetramethylsilane Example 4

28.9 g (0.130 mol) of D-NDM represented by formula (1a) obtained in Monomer Synthesis Example 1, 6.3 g (0.014 mol) of 9,9-bis(4-(2-hydroxyethoxy)phenyl)fluorene, 31.5 g (0.147 mol) of diphenyl carbonate and 0.09 mg (1.1 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate resin. Regarding the obtained polycarbonate resin, Mw was 27,000 and Tg was 142° C. The refractive index was 1.551, and the Abbe number was 45.5. The total light transmittance was 90%. Further, the saturated water absorption coefficient was 0.37%, and the hygroscopic expansion coefficient at the time of saturation was 0.038%.

Example 5

4.76 g (0.021 mol) of D-NDM represented by formula (1a) obtained in Monomer Synthesis Example 1, 37.6 g (0.086 mol) of 9,9-bis(4-(2-hydroxyethoxy)phenyl)fluorene, 23.3 g (0.109 mol) of diphenyl carbonate and 0.07 mg (0.9 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate resin. Regarding the obtained polycarbonate resin, Mw was 32,000 and Tg was 146° C. The refractive index was 1.626, and the Abbe number was 25.3. The total light transmittance was 89%. Further, the saturated water absorption coefficient was 0.37%, and the hygroscopic expansion coefficient at the time of saturation was 0.033%.

Example 6

11.3 g (0.051 mol) of D-NDM represented by formula (1a) obtained in Monomer Synthesis Example 1, 20.0 g (0.046 mol) of 9,9-bis(4-(2-hydroxyethoxy)phenyl)fluorene, 21.0 g (0.098 mol) of diphenyl carbonate and 0.05 mg (0.6 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate resin. Regarding the obtained polycarbonate resin, Mw was 35,000 and Tg was 144° C. The refractive index was 1.597, and the Abbe number was 30.0. The total light transmittance was 89%. Further, the saturated water absorption coefficient was 0.37%, and the hygroscopic expansion coefficient at the time of saturation was 0.038%.

Example 7

A polycarbonate resin was synthesized under conditions similar to those in Example 1, except that D-NDM represented by formula (1a) obtained in Monomer Synthesis Example 3 was used. Regarding the obtained polycarbonate resin, Mw was 38,000 and Tg was 140° C. The refractive index was 1.532, and the Abbe number was 57.2. The total light transmittance was 90%. Further, the saturated water absorption coefficient was 0.34%, and the hygroscopic expansion coefficient at the time of saturation was 0.033%.

Example 8

The D-NDM represented by formula (1a) obtained in Monomer Synthesis Example 3 (isomer mixture, which contains an isomer containing a hydroxymethyl group at 2,6-position (52% by mass) and an isomer containing a hydroxymethyl group at 2,7-position (48% by mass)) was subjected to distillation to obtain a D-NDM containing the isomer of 2,6-position (22% by mass) and the isomer of 2,7-position (78% by mass). A polycarbonate resin was synthesized under conditions similar to those in Example 1, except that this D-NDM was used. Regarding the obtained polycarbonate resin, Mw was 41,000 and Tg was 137° C. The refractive index was 1.531, and the Abbe number was 57.0. The total light transmittance was 90%. Further, the saturated water absorption coefficient was 0.35%, and the hygroscopic expansion coefficient at the time of saturation was 0.033%.

Example 9

The D-NDM represented by formula (1a) obtained in Monomer Synthesis Example 1 (isomer mixture, which contains an isomer containing a hydroxymethyl group at 2,6-position (76% by mass) and an isomer containing a hydroxymethyl group at 2,7-position (24% by mass)) was subjected to distillation to obtain a D-NDM containing the isomer of 2,6-position (99.5% by mass) and the isomer of 2,7-position (0.5% by mass). A polycarbonate resin was synthesized under conditions similar to those in Example 1, except that this D-NDM was used.

In a circular plate-like molded body, which was molded by using the obtained polycarbonate resin for the measurement of the refractive index and the Abbe number, white turbidity caused by crystallization was observed, and it was not enough for evaluating the refractive index and Abbe number as an optical material. Further, regarding the obtained polycarbonate resin, Mw was 40,000 and Tg was 143° C. The saturated water absorption coefficient was 0.33%, and the hygroscopic expansion coefficient at the time of saturation was 0.031%.

Example 10

25.05 g (0.106 mol) of D-NDM represented by formula (1b) below obtained in Monomer Synthesis Example 2, 22.78 g (0.106 mol) of diphenyl carbonate and 0.26 mg (3.1 μmop of sodium hydrogencarbonate were put into a 300 mL reactor equipped with a stirrer and a distillation apparatus, and it was heated to 215° C. over 1 hour under nitrogen atmosphere (760 Torr) and stirred. Heating was carried out in oil bath, and a transesterification reaction was initiated when the temperature reached 200° C. 5 minutes after the initiation of the reaction, stirring was started, and 20 minutes later, the pressure was reduced from 760 Torr to 200 Torr over 10 minutes. The temperature was increased to 210° C. while reducing the pressure, and increased to reach 220° C. 70 minutes after the initiation of the reaction. 80 minutes after the initiation of the reaction, the pressure was reduced to 150 Torr over 30 minutes, and the temperature was increased to 240° C. while reducing the pressure to 1 Torr. After that, it was kept for 10 minutes, thereby obtaining a polycarbonate resin.

Regarding the obtained polycarbonate resin, Mw was 38,000 and Tg was 135° C. The refractive index of the polycarbonate resin was 1.533, and the Abbe number was 56.8. The total light transmittance was 90%. Further, the saturated water absorption coefficient was 0.33%, and the hygroscopic expansion coefficient at the time of saturation was 0.035%.

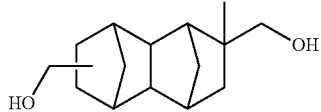

(1b)

Example 11

26.54 g (0.104 mol) of D-NDM represented by formula (1c) below obtained in Monomer Synthesis Example 4, 22.78 g (0.106 mol) of diphenyl carbonate and 0.26 mg (3.1 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate resin. Regarding the obtained polycarbonate resin, Mw was 35,000 and Tg was 133° C. The refractive index was 1.534, and the Abbe number was 56.6. The total light transmittance was 90%. Further, the saturated water absorption coefficient was 0.32%, and the hygroscopic expansion coefficient at the time of saturation was 0.034%.

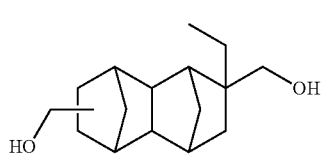

(1c)

The objective of the present invention is to provide a polycarbonate resin having a high Abbe number, wherein the difference between the hygroscopic expansion coefficient thereof and that of a polycarbonate resin having a high refractive index and a low Abbe number is small. Hereinafter, the water absorption coefficient (%) and the hygroscopic expansion coefficient (%) of resins which are objects to be bonded for lens forming (Object 1 and Object 2) and a resin having a high Abbe number (Comparative Example 1) are shown.

<Object 1>

The water absorption coefficient (%) and the hygroscopic expansion coefficient (%) were measured using a bisphenol A-type polycarbonate resin having a low Abbe number (molecular weight (Mw)=30,000, H-4000 manufactured by Mitsubishi Gas Chemical Company, Inc.). The results are shown in Tables 1 and 2.

Comparative Example 1

The water absorption coefficient (%) and the hygroscopic expansion coefficient (%) were measured using a cycloolefin polymer resin having a high Abbe number (molecular weight (Mw)=140,000, ZEONEX 330R manufactured by Zeon Corporation). The results are shown in Tables 1 and 2.

<Object 2>

The water absorption coefficient (%) and the hygroscopic expansion coefficient (%) were measured using an optical polycarbonate resin having a low Abbe number (molecular weight (Mw)=27,000, EP5000 manufactured by Mitsubishi Gas Chemical Company, Inc.). The results are shown in Tables 1 and 2.

TABLE 1

| Type of material | Time for immersion in water (H) | | | | | | | | | |
|---|---|---|---|---|---|---|---|---|---|---|
| | 0 | 24 | 48 | 144 | 240 | 384 | 692 | 1994 | 2352 | 2544 |
| Object 1 | 0 | 0.1423 | 0.1990 | 0.2677 | 0.2730 | 0.2749 | 0.2749 | saturated | | |
| Comparative Example 1 | 0 | 0.0148 | 0.0000 | 0.0000 | 0.0149 | 0.0052 | 0.0082 | saturated | | |
| Object 2 | 0 | 0.0861 | 0.1269 | 0.2027 | 0.2568 | 0.3017 | 0.3520 | 0.3796 | saturated | |
| Example 1 | 0 | 0.0510 | 0.0798 | 0.1261 | 0.1626 | 0.2016 | 0.2593 | 0.3385 | 0.3464 | saturated |

TABLE 2

| | Before measurement of water absorption coefficient mm | After measurement of water absorption coefficient mm | Hygroscopic expansion coefficient % |
|---|---|---|---|
| Object 1 | 39.116 | 39.133 | 0.043 |
| Comparative Example 1 | 39.451 | 39.452 | 0.003 |
| Object 2 | 38.923 | 38.945 | 0.057 |
| Example 1 | 39.214 | 39.229 | 0.038 |

According to the results in Tables 1 and 2, the value of the hygroscopic expansion coefficient of the polycarbonate resin having a low Abbe number of Object 2 (EP5000 manufactured by Mitsubishi Gas Chemical Company, Inc.) is near to the value of the hygroscopic expansion coefficient of the polycarbonate resin of Example 1, and it is understood that according to the present invention, the problem of "to provide a polycarbonate resin having a high Abbe number, wherein the difference between the hygroscopic expansion coefficient thereof and that of a polycarbonate resin having a high refractive index and a low Abbe number is small" can be solved. Meanwhile, the hygroscopic expansion coefficient of the resin having a high Abbe number of Comparative Example 1 is very low, and it is understood that the above-described problem of the present invention cannot be solved.

Comparative Example 2

108 g (0.75 mol) of dimethyl fumarate, 128 g (0.97 mol) of dicyclopentadiene and 300 g of p-xylene were put into an autoclave, and the inside of the system was substituted with nitrogen gas. Subsequently, the inner temperature of the autoclave was increased to 180° C., and the reaction was performed with stirring at the same temperature for 20 hours. After the reaction was completed, 6 g of 10% palladium-carrying activated carbon was added thereto, the inside of the system was substituted with hydrogen gas, and then hydrogen gas was fed to 21 MPa, and the reaction was performed with stirring at 80° C. for 1 hour. The reaction mixture was subjected to distillation under reduced pressure, and subsequently the obtained residue was recrystallized from ethanol, thereby obtaining dimethyl perhydro-1,4:5,8-dimethanonaphthalene dicarboxylate. 52 g of dimethyl perhydro-1,4:5,8-dimethanonaphthalene dicarboxylate, 5 g of copper-chromium oxide (N-203-SD manufactured by Nikki Chemical Co., Ltd.) and 100 mL of 1,4-dioxane were put into a 300 mL autoclave. Subsequently, the inside of the system was substituted with hydrogen gas, and after that, hydrogen gas was fed, and the reaction was performed under a pressure of 30 MPa at 200° C. for 20 hours. After the reaction was completed, 1,4-dioxane was removed to obtain a white powder, and this was recrystallized from ethyl acetate, thereby obtaining perhydro-1,4:5,8-dimethanonaphthalene-2,3-dimethanol represented by the below-described structural formula.

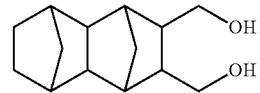 [SMILES: OCC1C(CO)C2CC1C1C3CCC(C3)C21]

30.90 g (0.139 mol) of the thus obtained perhydro-1,4:5,8-dimethanonaphthalene-2,3-dimethanol, 29.80 g (0.139 mol) of diphenyl carbonate and 0.09 mg (1.1 µmol) of sodium hydrogencarbonate were put into a 300 mL reactor equipped with a stirrer and a distillation apparatus, and it was heated to 215° C. over 1 hour under nitrogen atmosphere (760 Torr) and stirred. Heating was carried out in oil bath, and a transesterification reaction was initiated when the temperature reached 200° C. 5 minutes after the initiation of the reaction, stirring was started, and 20 minutes later, the pressure was reduced from 760 Torr to 200 Torr over 10 minutes. The temperature was increased to 210° C. while reducing the pressure, and increased to reach 220° C. 70 minutes after the initiation of the reaction. 80 minutes after the initiation of the reaction, the pressure was reduced to 150 Torr over 30 minutes, and the temperature was increased to 240° C. while reducing the pressure to 1 Torr. After that, it was kept for 10 minutes, thereby obtaining a polycarbonate resin.

Based on JIS K7113, the obtained polycarbonate resin was molded into a shape of Type-1 test piece to measure the tensile yield elongation (tensile speed: 2 mm/min). The tensile yield elongation of the polycarbonate resin obtained in Comparative Example 2 was 51%, while the tensile yield elongation of the polycarbonate resin obtained in Example 3 was 150%.

INDUSTRIAL APPLICABILITY

According to the present invention, it is possible to obtain an excellent optical lens having a high Abbe number. The optical lens of the present invention can be obtained by injection molding, realizes high productivity and is inexpensive, and therefore can be used in the field in which expensive glass lenses having a high Abbe number have been conventionally used including cameras, telescopes, binoculars and television projectors and it is very useful. Further, it is particularly appropriately used for small optical lens units because the difference between the water absorption coefficient of the lens having a high Abbe number and the water absorption coefficient of the lens having a low Abbe number becomes small. Moreover, according to the present invention, an aspherical lens having a high Abbe number, which is technically difficult to obtain by processing a glass lens, can be conveniently obtained by injection molding, and therefore it is very useful.

The invention claimed is:

1. A polycarbonate resin comprising a structural unit represented by formula (1) below:

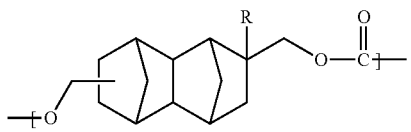

wherein R represents H, $CH_3$ or $C_2H_5$, which comprises a mixture of: an isomer to which a —$CH_2O$— group in formula (1) is bound at 6-position (isomer of 2,6-position); and an isomer to which the —$CH_2O$— group in formula (1) is bound at 7-position (isomer of 2,7-position);

wherein the isomer of 2,6-position and the isomer of 2,7-position are contained at a mass ratio of 1.0:99.0 to 99.0:1.0.

2. The polycarbonate resin according to claim 1, which has a hygroscopic expansion coefficient of 0.01 to 0.5%.

3. The polycarbonate resin according to claim 1, which has an Abbe number of 25 or higher.

4. The polycarbonate resin according to claim 1, which has a glass transition temperature of 110 to 160° C.

5. The polycarbonate resin according to claim 1, which has a weight-average molecular weight of 5,000 to 50,000.

6. A method for producing a polycarbonate resin, which comprises reacting a diester carbonate with a diol compound represented by formula (2) below:

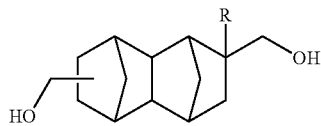

wherein R represents H, $CH_3$ or $C_2H_5$, wherein the diol compound comprises a mixture of: an isomer to which a —$CH_2OH$ group in formula (2) is bound at 6-position (isomer of 2,6-position); and an isomer to which the —$CH_2OH$ group in formula (2) is bound at 7-position (isomer of 2,7-position):

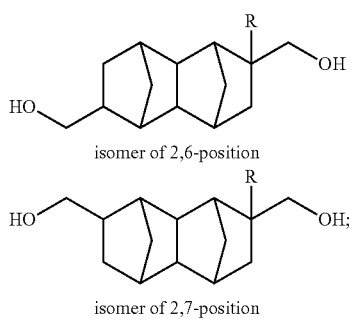

and wherein the isomer of 2,6-position and the isomer of 2,7-position are contained at a mass ratio of 1.0:99.0 to 99.0:1.0.

* * * * *